United States Patent [19]

Nees et al.

[11] Patent Number: 5,442,300

[45] Date of Patent: Aug. 15, 1995

[54] ULTRAFAST ELECTRICAL SCANNING FORCE MICROSCOPE PROBE

[75] Inventors: John A. Nees, Ann Arbor, Mich.; Shin-ichi Wakana, Sagamihara, Japan

[73] Assignees: Regents of the University of Michigan, Ann Arbor, Mich.; Fujitsu Limited, Kanagawa, Japan

[21] Appl. No.: 236,525

[22] Filed: Apr. 29, 1994

[51] Int. Cl.$^6$ ............... G01R 31/28; G01R 31/02
[52] U.S. Cl. ............... 324/762; 324/96; 324/752
[58] Field of Search ............... 324/754, 752, 158.1, 324/96

[56] References Cited

PUBLICATIONS

K. Takeuchi & Y. Kashara, "High–Speed Optical Sampling Measurements of Electrical Waveform Using a Scanning Tunneling Microscope", Appl. Phys. Lett. 63 (26), Dec. 27, 1993.

S. Weiss, D. F. Ogletree, M. Salmeron and D. S. Chemia, "Ultrafast Scanning Probe Microscopy", Appl. Phys. Lett. 63 (18) Nov. 1, 1993.

S. Weiss, D. Botkin, D. S. Chemla, "Ultrafast Scanning Microscopy", OSA Proceedings on Ultrafast Electronics and Optoelectronics, 1993 vol. 14, Jagdeep Sha and Umest Mishra.

A. S. Hou, F. Ho, D. M. Bloom, "Picosecond Electrical Sampling Using a Scanning Force Microscope". OSA Proceedings on Ultrafast Electronics and Optoelectronics, 1993, vol. 14, Jagdeep Shah and Umest Mishra (eds.), p. 166.

J. Nees, S. Williamson, J. Kim and S. Gupta, "Picosecond Detector, Optical Temporal Analyzer and Free–-Standing Circuit Probe", OSA Proceedings on Ultrafast Electronics and Optoelectronics, 1993, vol. 14, Jagdeep Shah and Umest Mishra (eds.) p. 186.

Joungho Kim, Steven Williamson, John Nees, Shin Ichi Wakana and John Whitaker, Photoconductive Sampling Probe with 2.3 ps. Temporal Resolution and 4–$\mu$V Sensitivity, Appl. Phys. Lett., 62 (18), May 3, 1993; and.

C. A. Spindt, I. Brodie, L. Humphery & E. R. Westerberg, "Physical Properties of Thin–Film Emission Cathodes with Molybdenum Cones", J. of Appl. Phys. 42 (12), Dec. 1976.

*Primary Examiner*—Ernest F. Karlsen
*Assistant Examiner*—Russell M. Kobert
*Attorney, Agent, or Firm*—Brooks & Kushman

[57] ABSTRACT

An ultrafast scanning probe with 2.5-picosecond response time and 10-nanometer spatial resolution. In one embodiment, a single probe tip is formed on an input electrode layer which is at least partially formed on a cantilever portion of the probe. The cantilever portion is formed by at least one layer including a film of Al-GaAs which has a reflective top surface to reflect a laser beam therefrom. A photoresponsive planar switch is formed by a portion of the input electrode layer, a semiconductor portion of the at least one layer and a portion of an output electrode layer. In another embodiment, the switch is a non-planar photoresponsive switch. The single probe tip of the probe is utilized to both acquire an image of an electronic device and measure electrical signals of the device. An optical fiber may be used for support and to supply a pulsed switching beam to the photoresponsive switch.

17 Claims, 4 Drawing Sheets

ULTRAFAST ELECTRICAL SCANNING FORCE MICROSCOPE PROBE

CROSS-REFERENCE TO RELATED APPLICATIONS

This application is related to U.S. patent applications entitled "High-Speed, High-Impedance External Photoconductive-Type Sampling Probe/Pulser", U.S. Ser. No. 07/882,053 and "Photoresponsive Interdigitated Metal-Semiconductor-Metal Structure", U.S. Ser. No. 07/882,055, both filed on May 12, 1992, both of which are assigned to one of the joint owners of the present application and both of which are hereby incorporated in their entirety by reference.

TECHNICAL FIELD

This invention relates to high-speed probes and, in particular, for high-speed, scanning probes for use in scanning probe microscopes to obtain picosecond temporal resolution and nanometer spatial resolution.

BACKGROUND ART

The reduction of line dimensions in integrated circuits and the increase in the electronic device speeds has led to the need for high-speed probes with sub-micron spatial resolution. The new generation of high-speed electronic devices are designed with sub-micron features in transverse dimensions as well as depth.

Conventional means of visualizing such dimensions include the scanning electron microscope and a class of scanning probe microscopes. Electron-beam testers are the only tool used to measure the internal workings of circuits with nanometer resolution. These systems are highly specialized and require measurement in high vacuum. Electron interaction with the surface of devices also leads to damage. Finally, the bandwidth of these test systems does not exceed 20 GHz. Another of the conventional means of testing such high-speed electronic devices is a network analyzer. This does not have a capability to see the internal node of the device under test. Such network analyzers only measure the relationship between the input and output of the device and assumes the internal working of the device.

Others have done experiments which utilize the high-speed, nonlinear properties of the tunneling current in a scanning tunneling microscope to achieve picosecond temporal resolution. This is not practical as a test method because the feedback mechanism which controls the probe tip's position uses the parameter which is to be measured. Tunneling current is also highly nonlinear.

One other group is using atomic force techniques, but their probe again uses the same mechanism to sense electrical signals as that used in forming an image of the circuit.

A second class of probes are electro-optic and photoconductive probes. Both of these measurement techniques were developed in systems which are integrated with the device under test. Both have also evolved into external probes. Neither has the ability to resolve signals on sub-micron features. Aside from the fact that they do not have means of visualizing the circuit under test, the optical probe is not capable of resolution finer than a single micron and the bulk photoconductive probe is likely to damage the circuit or to be damaged itself due to lack of flexibility.

In general, the prior art electronic testers can be grouped as follows:
e-beam voltage contrast
  50-ps temporal resolution
  high vacuum required electro-optic probe
electro-optic probe
  1-$\mu$m spatial resolution
network analyzers
  no internal node testing
  10-ps temporal resolution.

Relevant publications include:

1. Koichiro Takeuchi and Yukio Kasahara, "High-Speed Optical Sampling Measurement Of Electrical Waveform Using a Scanning Tunneling Microscope", APPL. PHYS. LETT. 63 (26), 27 December 1993 (Received 27 Jul. 1993). Teratec Corp. 2-9-32 Naka-cho, Musashino, Tokyo 180 Japan.

2. S. Weiss, D. F. Ogletree, M. Salmeron and D. S. Chemla, "Ultrafast Scanning Probe Microscopy", APPL. PHYS. LETT. 63 (18), 1 Nov. 1993 (Received 17 Jun. 1993). Lawrence Berkeley Laboratory, Berkeley, Calif. 94720.

3. S. Weiss, D. Botkin, D. S. Chemla, "Ultrafast Scanning Microscopy", OSA PROCEEDINGS ON ULTRAFAST ELECTRONICS AND OPTOELECTRONICS, 1993, Vol. 14, Jagdeep Shah and Umest Mishra (eds.), p. 162. Same address as above.

4. A. S. Hou, F. Ho, D. M. Bloom, "Picosecond Electrical Sampling Using A Scanning Force Microscope", OSA PROCEEDINGS ON ULTRAFAST ELECTRONICS AND OPTOELECTRONICS, 1993, Vol. 14, Jagdeep Shah and Umest Mishra (eds.), p. 166.

5. J. Nees, S. Williamson, J. Kim and S. Gupta, "Picosecond Detector, Optical Temporal Analyzer And Free-Standing Circuit Probe", OSA PROCEEDINGS ON ULTRAFAST ELECTRONICS AND OPTOELECTRONICS, 1993, Vol. 14, Jagdeep Shah and Umest Mishra (eds.), p. 186. University of Michigan, Center for Ultrafast Science, 1006 IST Bldg., 2200 Bonisteel Blvd., Ann Arbor, Mich. 48109-2099.

6. Joungho Kim, Steven Williamson, John Nees, Shin Ichi Wakana and John Whitaker, "Photoconductive Sampling Probe With 2.3 ps Temporal Resolution And 4-$\mu$V Sensitivity, APPL. PHYS. LETT. 62 (18), 3 May 1993 (Received 8 Sep. 1992). University of Michigan, Center for Ultrafast Science, 1006 IST Bldg., 2200 Bonisteel Blvd., Ann Arbor, Mich. 48109-2099.

7. C. A. Spindt, I. Brodie, L. Humphery and E. R. Westerberg, "Physical Properties Of Thin-Film Emission Cathodes with Molybdenum Cones", J. OF APPL. PHYS. 47 (12), December 1976 (Received 18 Mar. 1976). Stanford Research Institute, Menlo Park, Calif. 94025.

SUMMARY OF THE INVENTION

An object of the present invention is to provide an ultrafast, scanning probe capable of making electrical measurements outside of vacuum with very low probability of damage without using high energy electrons to accomplish these measurements.

Another object of the present invention is to provide an ultrafast, scanning probe which incorporates temporal resolution into a scanning probe microscope.

Still another object of the present invention is to provide a scanning probe which has a single tip to perform both imaging and high-speed electrical measurements. Atomic force microscopy is used to visualize the device-under-test, while photoconductive switching is used to measure the electronic signals. The probe makes physical contact to the device under test. This contact allows more accurate determination of voltage levels, eliminating some calibration procedures.

Further still, another object of the present invention is to provide a scanning probe which has: (1) 2-ps temporal resolution; (2) atmospheric operation; (3) 0.1-$\mu$m spatial resolution; and (4) high impedance internal node testing with 2-ps resolution.

In carrying out the above objects and other objects of the present invention, a scanning probe adapted for use in a microscope to obtain both high spatial resolution images and high temporal resolution electronic waveforms of an electronic device is provided. The probe includes a substrate and at least one layer including a base portion formed and supported on the substrate and a cantilever portion extending from the base portion and unsupported by the substrate. The probe also includes a single electrically conductive probe tip formed on and extending downwardly from a free end of the cantilever portion in electrical communication with a semiconductor portion of the at least one layer. An output electrode layer is formed on the at least one layer and is adapted to be electrically connected to a first electronic processor. A photoresponsive switch is formed from the semiconductor portion of the at least one layer and a portion of the electrode layer. At least one end of the electrode layer is formed on the at least one layer and is adapted to be electronically connected to a first electronic processor. The cantilever portion has a bottom surface and a reflective top surface adapted to reflect a beam of coherent light wherein a reflected beam of the coherent light is processed by a second electronic processor to generate an image of the electronic device and wherein the at least one layer is adapted to receive and direct a pulsed switching beam to the photoresponsive switch to electrically communicate the probe tip and the output electrode layer to thereby sample an electronic waveform at a desired location on the electronic device when the probe tip is pressed into low force contact with the electronic device at the desired location.

Preferably, in one embodiment, an input electrode layer is formed on the free end of the cantilever portion in electrical communication with the probe tip and wherein both the input and output electrode layers are formed on the at least one layer by photolithography.

Some of the novel features of the present invention as described herein are (1) the fabrication process for bringing the front end of a signal processor out on the cantilever of a sensor probe of a scanning probe microscope, (2) the use of a nonplanar photoresponsive switch, (3) the use of a single tip to visualize and to measure electric signals, and (4) the use of an optical fiber as a support or substrate for the probe.

Preferably, the probe includes a highly resistive photoresponsive gate. This is accomplished by forming the gate on Low-Temperature-Grown GaAs (LT-GaAs). It is made to be an integral part of a scanning force microscope cantilever by the use of microlithography. The submicron tip is formed by self-terminating lift-off lithography. The probe is liberated from the bulk material by chemical etching on both faces of the GaAs wafer. The probe is comprised not of two tips, performing different functions, but of one which performs both functions. The state-of-the art has not produced the combination of scanning probe microscopy with ultrafast temporal resolution because high-speed probes are made on thick, rigid substrates and scanning probe tips have not been not formed with high-speed switches.

Conventional circuit probes for high-speed electronics do not have high spatial resolution, with the exception of voltage contrast electron beam testers. Present test technology takes two major forms. One form is the network analyzer working up to more than 100 GHz, as represented in the literature. This type of testing requires sizable test patterns and is generally limited to a 50-$\Omega$ impedance environment. More recent developments involve the use of electro-optic or photoresponsive probes which can operate with much higher impedance levels. None of these probes can achieve nanometer-scale resolution. Modern sub-micron circuits are not internally testable by these probes. The second form of conventional probes involves touching a needle to the circuit-under-test. These testers are limited to measurements in the MHz range. They are also not capable of measuring signals on sub-micron-dimension circuit elements.

The ultrafast nano-probe of the present invention is capable of picosecond temporal resolution of electrical waveforms with 10-nm spatial resolution.

In summary, the probe of the present invention has the following advantages:
  feedback control independent from signal;
  the use of photolithography which lends itself to mass production; (see Section 2 of Reference 7 noted above and, in particular, pages 5248–5250).
  low-force contact with active feedback insures both sensitivity and absence of damage to the device under test.

Also, in summary, the prior art has the following disadvantages:
  probes use identical mechanism (i.e. the probe uses the same physical mechanism for imaging feedback and electrical waveform acquisition or two separate probes) for feedback and signal acquisition or two separate probes;
  fabrication does not lend itself to mass production;
  contact or lack thereof limits the probes ability to make sensitive noninvasive measurements.

BEST MODE FOR CARRYING OUT THE INVENTION

Figure 1:
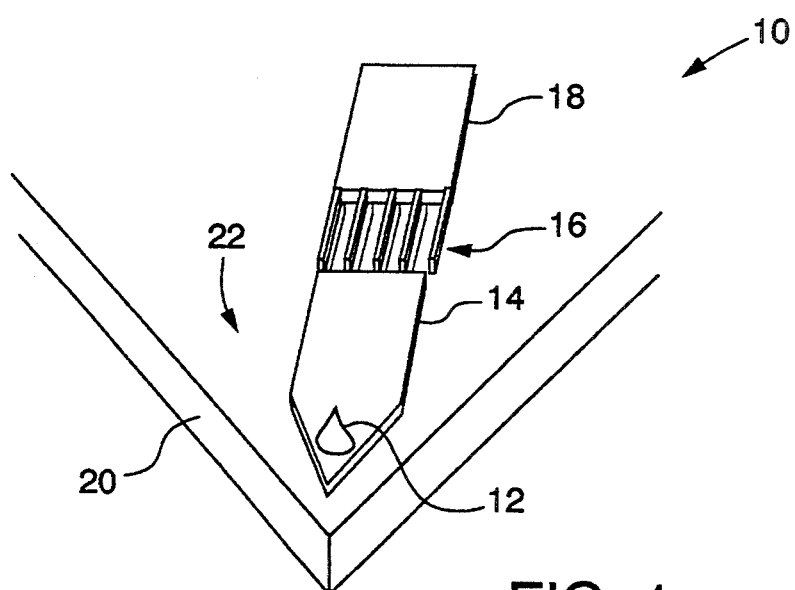
FIG. 1 is a schematic bottom perspective view of a first embodiment of a scanning probe constructed in accordance with the present invention.

In general, a scanning probe of the present invention allows the combination of Atomic Force Microscopy (AFM), with its sub-nanometer spatial resolution, and photoconductive sampling, with single picosecond temporal resolution.

A scanning probe microscope with high spatial resolution utilizes a picosecond nano-probe of the present invention. A first embodiment of the scanning probe is generally indicated at 10 in FIGS. 1, 3 and 4 and includes a metallic probe tip or contacting point 12 of conical shape with a submicron tip-radius. The point 12 is used for the purpose of making contact with a semiconductor device or system such as illustrated at 13 in FIG. 8. Preferably, the point 12 is formed by self-terminating lift-off as described in detail in reference 7 at Section 2, pages 5248–5250 noted above.

The point 12 communicates by way of a metallic input electrode layer 14 with a gate, generally indicated at 16, which is capable of providing time resolution by means of sampling high-frequency electric energy.

The probe 10 further includes a metallic output electrode layer 18 which communicates a processed signal from the sampling gate 16 to a post processor (not shown), which could be a lock-in amplifier or an analog-to-digital converter with a preamplifier.

The point 12 is formed so as to reside on a free moving part 20 of a cantilever portion, generally indicated at 22, which, in turn, is made from a pair of film layers 24 and 26, as is described in greater detail hereinbelow.

The input electrode 14, the sample gate 16 and output electrode 18 reside on the cantilever portion 22, with the output electrode 18 adapted to communicate to the post processor by an electrical connection on a support or substrate of the probe 10. The support may consist of a material such as a thin glass layer or fiber which is, itself, supported and manipulated by electronically controlled actuators such as piezoelectric or electrostrictive transducers of a scanning probe microscope.

Figure 3:
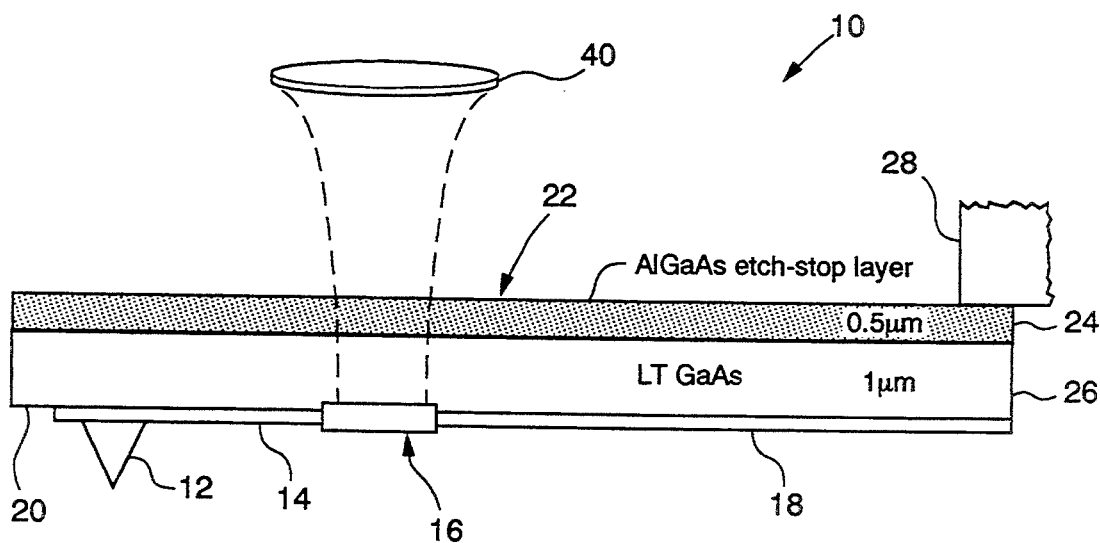
FIG. 3 is a side schematic view of a cantilever portion of the scanning probe, slightly modified from the scanning probe of FIG. 1, and having a planar gate.
Figure 4:
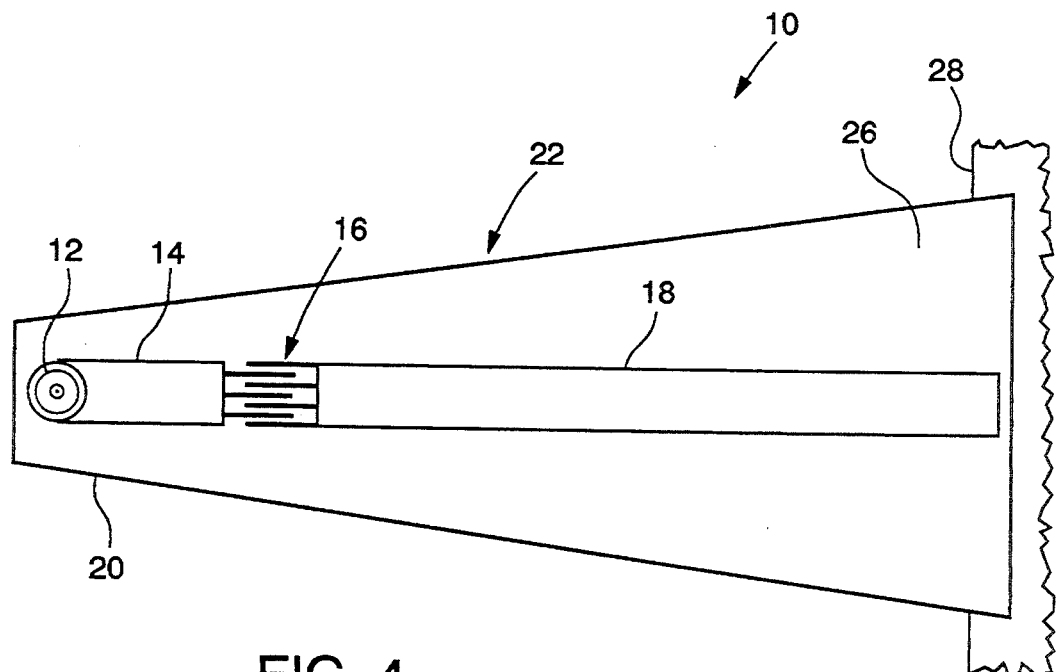
FIG. 4 is a bottom view of the cantilever portion of FIG. 3.

Probe Of FIGS. 1, 3 and 4—Fabrication

Low-Temperature-Grown GaAs is grown by molecular-beam epitaxy on an AIGaAs etch-stop layer on a semi-insulating GaAs substrate. The probe's perimeter is defined by front-side etch penetrating through both epilayers. In other words, the probe 10 is formed by etching the perimeter of the probe into the face of a wafer of SI-GaAs having epitaxial layers of AlGaAs and LT-GaAs (containing 50% Al and 50% Ga concentrations) 0.5 μm and 1-μm thick, respectively. Then, the input and output electrode layers 14 and 18 defining a photoconductive switch are placed by photolithography and are joined as the planar MSM photoresponsive switch 16.

At the end of the input electrode layer 14, opposite the switch-end, the sub-micron conical tip 12 is deposited and formed by self-terminating lift-off.

This structure is then released from its bulk substrate by a backside etchant in which Al0.5Ga0.5As has reduced solubility relative to GaAs. In other words, the substrate is removed by polishing and a back-side etch, freeing the 1.5 μm thick film of LT GaAs and AlGaAs.

The 1.5-μm-thick film is then mounted by an adhesive such as UV curing cement to the edge of a support substrate such as a glass support 28 of 0.1 to 1 mm thickness and few-mm transverse dimensions. Alternatively, the film may be mounted on an optical fiber, as illustrated at 30 in FIGS. 8 and 9, and through which a switching beam of light may pass.

Referring again to FIGS. 1, 3 and 4, the output electrode 18 is electrically connected to the post processor and this unit is then fastened to a piezoelectrically driven scanning stage for scanning force microscopy.

Figure 2:
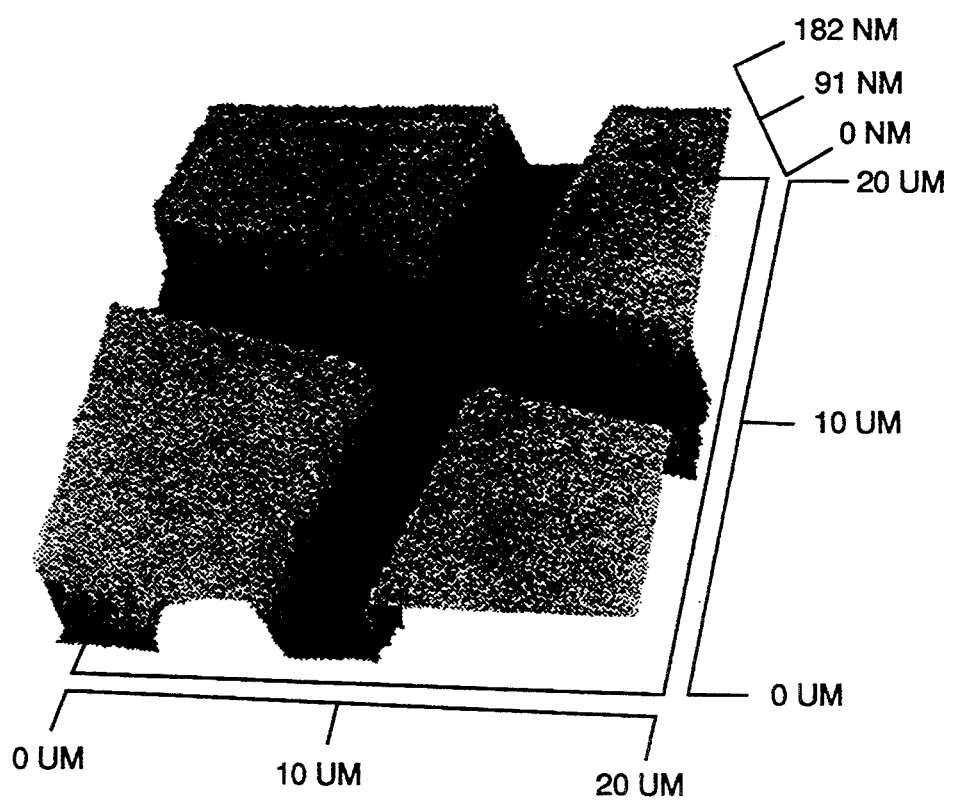
FIG. 2 is an AFM image acquired by the scanning probe of FIG. 1.
Figure 8:
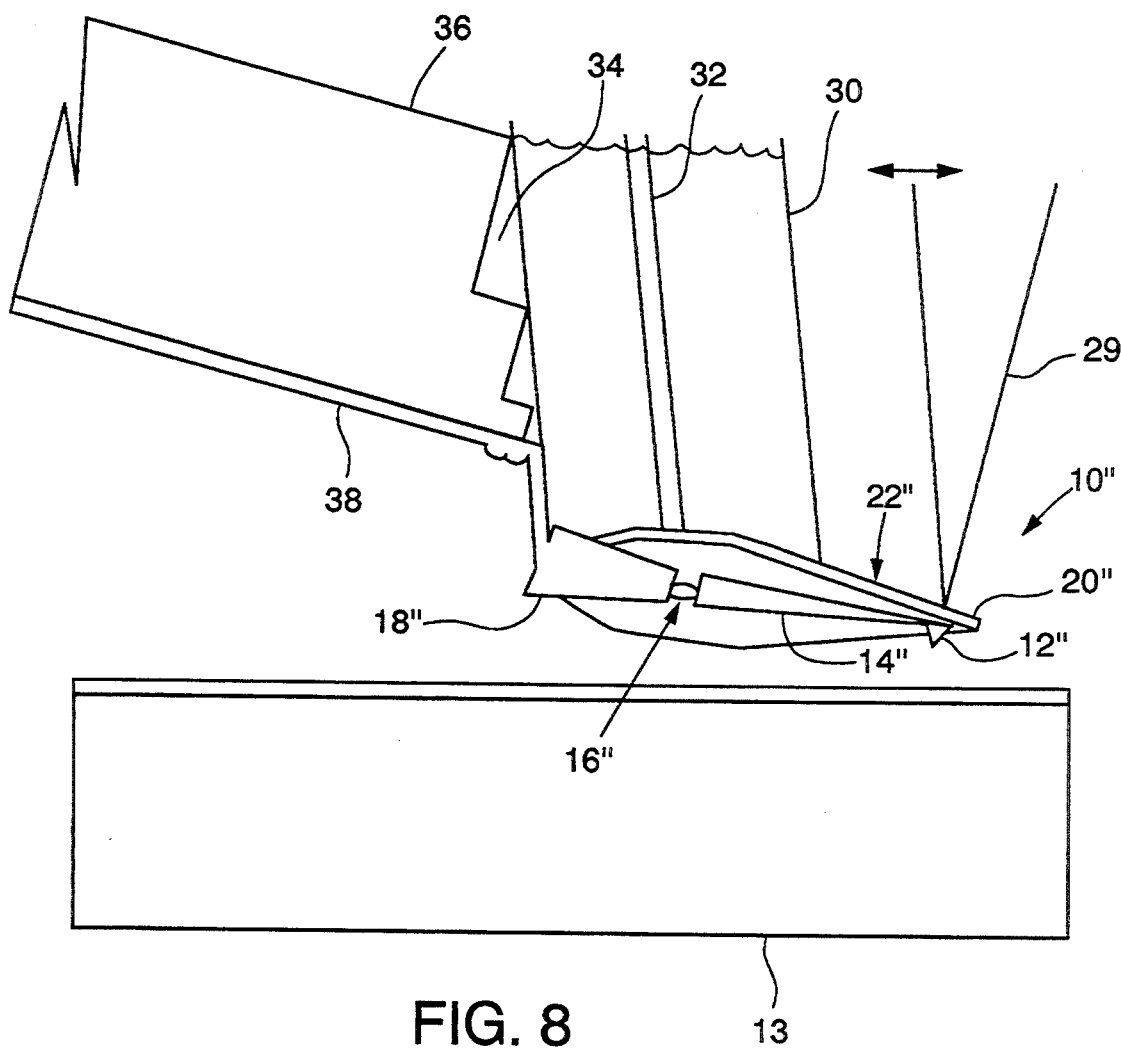
FIG. 8 is a side schematic view of a fiber optic-supported cantilever portion and a sample semiconductor device under test.

After scanning an image to produce an image such as the image of FIG. 2, the tip 12 is placed in contact at the desired location on the semiconductor device such as the device 13 in FIG. 8 and a lens, such as a lens 40 illustrated in FIG. 3, is used to direct a pulsed laser beam to the photoresponsive gate 16. With temporal delay being applied to the optical pulses, an electrical waveform in the semiconductor device is sampled.

Detailed Fabrication Procedure

0. Cleaning
   a. Trichloroethylene 5 min, acetone 5 min, isopropanol dip.
1. Alignment marks
   a. Photoresist 1470, 30 sec, 5K RPM,
   b. Bake 80° C. 1 min; chlorobenzene 7 min, bake 105° C. 1 min.,
   c. Expose 7 sec, 350 developer 30–60 sec.,
   d. Evaporate Ti 500 Å, lift-off in acetone,
   e. Acetone, isopropanol clean, oxide etch ~30 sec in buffered HF, dehydronization 120° C., 10 min.
2. Probe pattern etching
   a. Photoresist 1811, 30 sec, 4.5K RPM,
   b. Softbake 105° C. 1 min (hot plate),
   c. Expose 5 sec,
   d. Postbake 130° C. 1 min (hot plate),
   e. 351 developer 40 sec,
   f. 120° C. 10 min hardbake in oven,
   g. Etch in $H_3PO_4:H_2O_2:H_2O=3:1:25$, 10 min* 0.2 mm/min=2 m.
3. SiO$_2$ deposition (front side)
   a. Evaporate 1000 Å SiO$_2$ on front side.
4. SiO$_2$ etched on switch area
   a. Photoresist 1811, 30 sec, 4.5K RPM,
   b. Softbake 105° C. 1 min (hot plate),
   c. Expose 5 sec,
   d. Postbake 130° C. 1 min (hot plate),
   e. 351 developer 40 sec,
   f. Etch in buffered HF ~30 sec.
5. Metal line & switch evaporation
   a. Photoresist 1470, 30 sec, 5K RPM,
   b. Bake 80° C. 1 min, chlorobenzene 7 min., 105° C. 1 min,
   c. Expose 7 sec,
   d. 351 developer 40 sec,
   e. Oxide etch:NH$_4$OH:H$_2$O (1:15, blue container) 30 sec, rinse,
   f. Evap Ti 3000 Å (greater than two times of the thickness of SiO$_2$).
6. Tip formation
   a. Photoresist 1400-37, 30 sec, 5K RPM,
   b. Softbake 60° C. 15 min in oven,
   c. Chlorobenzene 20 min,
   d. Bake 90° C. 30 min in oven,
   e. Expose 10 sec, 351 developer 1 min,
   f. Evaporate Ti/Al/Ti/Ti/Ti=1000 Å/1 m/3 m/1 m/1.5 m (inspect).
7. Back side polish
   a. Photoresist 1400-37, 30 sec, 2.5K RPM on front side,
   b. Bake 90° C., 30 min in oven,
   c. Polish down to 120 m.
8. Backside etching a. Black wax on front side
b. Etched by $NH_4OH:H_2O = 1:24$ (speed=5-7 mm/min) 30 min,
c. Remove black wax.

Probe Use

The probe 10 is designed to be used in place of conventional AFM probes. Initially, the probe 10 is mounted on an AFM scanner. A cw laser is reflected from the top surface of the cantilever portion 22 to a quadrant detector (not shown). The tip 12 is lowered to the device-under-test (item 13 in FIG. 8). Feedback is engaged. An image is generated by monitoring the height-signal as the tip 12 is scanned in the transverse directions. Once an image of the device-under-test is scanned the probe tip 12 is positioned at the desired location and pressed into low-force contact with the signal-line to be interrogated. A sub-picosecond switching beam is directed at the top surface of the probe 10 to the photoconductive switch 16. The optical pulses open the photoconductive switch 16 for a period of about 1 ps. (This samples the electronic waveform on the device-under-test 13 by allowing an amount of current proportional to the waveform voltage to pass on to the detection electronics). The optical delay of the switching beam is scanned to perform equivalent time sampling of the repetitive waveform.

Experiment

Scanning probes fabricated following the above description have been used in separate experiments to acquire high spatial-resolution images and high temporal-resolution waveforms. For image acquisition, a procedure identical to that used for commercial AFM probes was followed on the Topometrix Explorer 1000 system.

For high temporal-resolution waveform acquisition, a probe was made using LT-GaAs which displayed sub-picosecond transient reflectivity. It was mounted as described above. In low-force contact, the probe has a dark conductance of 0.05 nS as measured using a Fluke 27 multimeter. This represents the leakage current flowing through the photoconductive switch 16 and the tip 12 to the device under test. The signal to be measured was generated on 20-$\mu$m wide coplanar strips having 40-$\mu$m center-to-center spacing. The generating switch and the sampling switch were activated by two beams derived from the same 100-fs Ti:Sapphire laser operating at 800 nm. Delay in the arrival of the two beams was scanned by a computer controlled optical delay line. The laser operated at a repetition rate of 100 MHz and produced 9 mW in the excitation beam and 0.8 mW in the probe beam.

Results

The flexibility and strength of the cantilever portion 22 of the probe 10 is similar to those observed for commercially available probes. Reflectivity of the AFM signal was lower by a factor of three due to absorption in the GaAs, but atomic force imaging is quite reproducible on the 100-nm scale (10-nm in z). A scanned image of a 2-$\mu$m test pattern is shown in FIG. 2.

Figure 5:
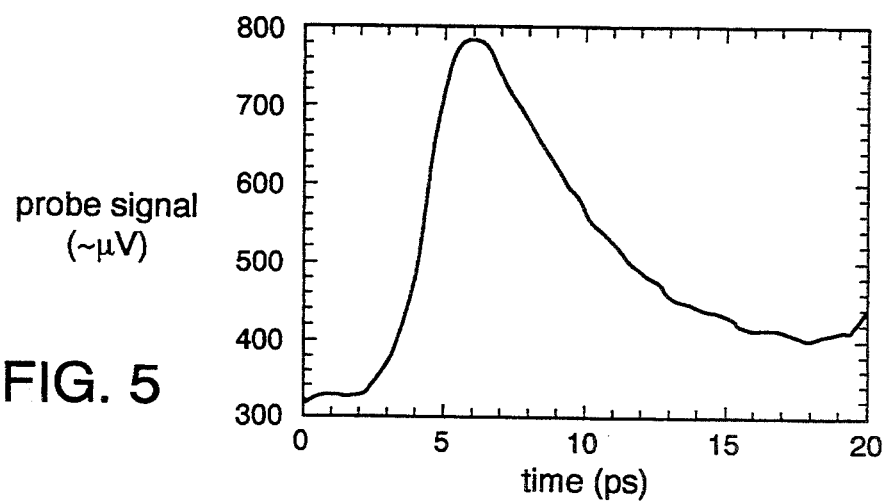
FIG. 5 is a graph illustrating a waveform acquired 60 $\mu$m from a 20×20-$\mu$m photoconductive switch on LT-GaAs.

Using the same type of probe, an impulse response of 2.5 ps was measured, as illustrated in FIG. 5. Signal-to-noise equal to unity was seen at a signal level on the order of 1 $\mu V/\sqrt{Hz}$. These preliminary results display an offset equal to 42% of the peak signal. The baseline to signal proportion does not scale with the power in either pump or probe beams.

As described above, atomic force imaging using a photoconductive probe with 2.5-ps response-time and 1-$\mu$V sensitivity is provided. It is clear that the combination of these measurements into a single instrument allows one to make time resolved measurements on nanometric structures. This provides a valuable tool for high-speed, high-density device testing.

Second Embodiment

Figure 6:
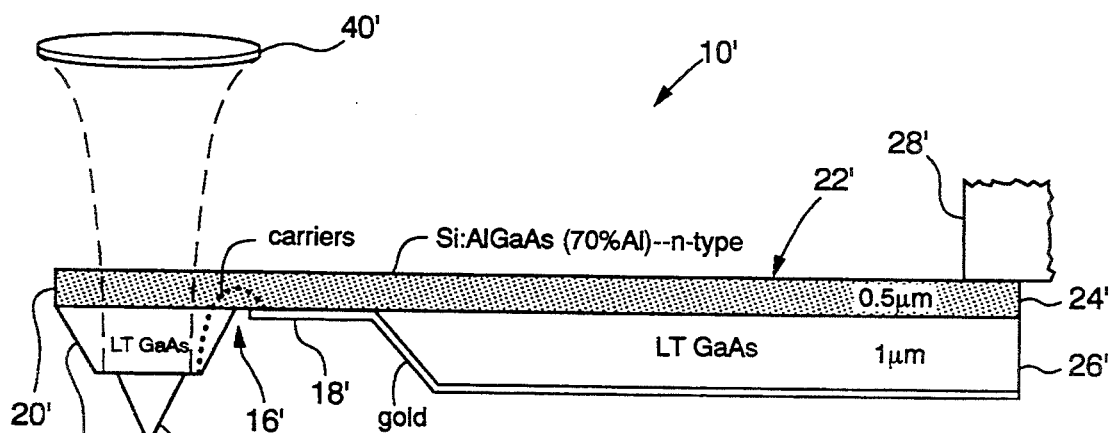
FIG. 6 is a schematic side view of a second embodiment of a scanning probe including a cantilever portion having a vertical non-planar switch configuration.
Figure 7:
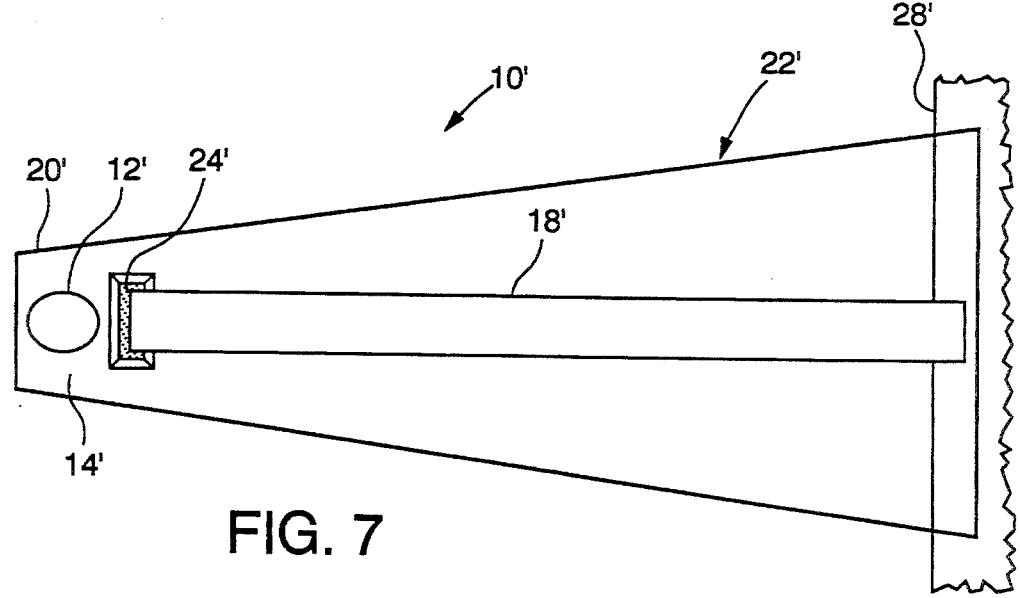
FIG. 7 is a bottom view of the cantilever portion of FIG. 6.

A second embodiment of the scanning line 10 probe is illustrated at 10' in FIGS. 6 and 7 wherein a vertical or non-planar switch configuration is shown. Parts of the probe 10' which are the same or perform the same or similar function to the parts of FIG. 1 are given the same reference number and a prime designation.

The configuration of FIGS. 6 and 7 is helpful in preventing the leakage of light through the switching area to the device under test. Such a switch would operate under conditions similar to those described in the above-noted second referenced patent application with carrier transit-time essentially equal to carrier lifetime. When under test, electrons flow from the tip 12' to the input electrode layer 14' of LT-GaAs, through a portion of conductive layer 24', and to the gold output electrode layer 18'.

Third Embodiment

Figure 9:
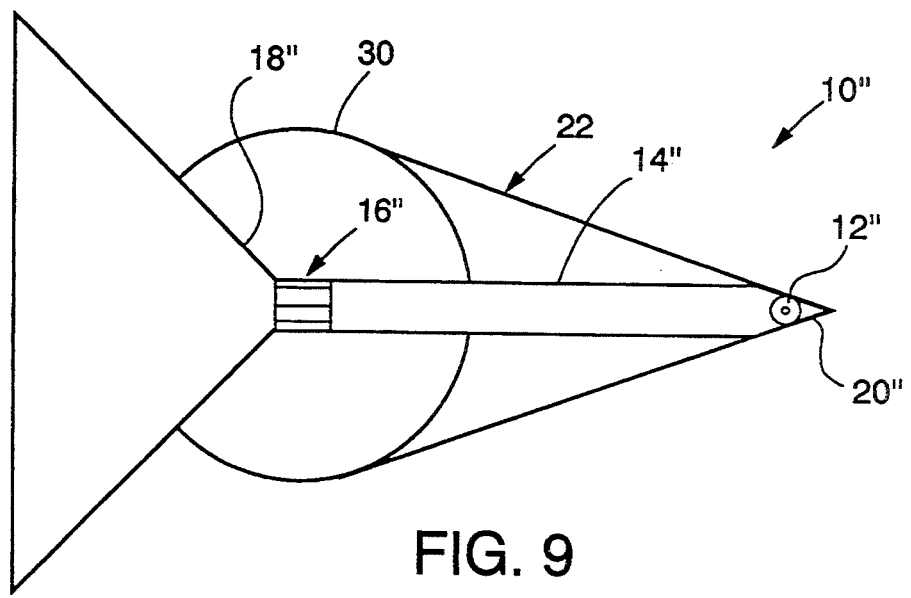
FIG. 9 is a bottom view of the apparatus of FIG. 8.

FIGS. 8 and 9 show still another embodiment of the present invention wherein parts which perform the same or similar function to the parts of the first two embodiments have the same reference numeral but have a double prime designation.

A force sensing laser beam 20 reflects off the top surface of a free moving part 20" of a cantilever portion 22" as in the first two embodiments.

A fiber core 32 of the optical fiber 30 transmits most of a sub-picosend switching beam to the photoconductive switch 16".

The optical fiber 30 is fixedly mounted to a fiber support 36 by an adhesive layer 34. In turn, the fiber support 36 can be translated by the microscope.

A conductive layer 38 forms an electrical connection between an output electrode layer 18" and an electronic processor. The conductive layer 38 is formed on a portion of the optical fiber 30 and the fiber support 36.

In the market of computer circuits and telecommunications networks, the capability to diagnose critical circuits on the nanometer scale is already the key factor providing an economic advantage to companies which are able to specify marginal advantage in speed or significant advantage in reliability. Due to the density and complexity of these circuits, internal testing is seen as a shortcut to achieving speed and reliability through improved design and testability. This process and device would enable the end user to measure high speed signals at virtually any location on the surface of an electronic device.

The probe of the present invention is useful in making $\mu V/\sqrt{Hz}$-sensitivity waveform measurements with picosecond temporal resolution on device structures smaller than 0.1 $\mu$m.

While the best mode for carrying out the invention has been described in detail, those familiar with the art to which this invention relates will recognize various alternative designs and embodiments for practicing the invention as defined by the following claims.

What is claimed is:

1. A scanning probe adapted for use in a microscope to obtain both high-spatial resolution images and high-temporal resolution electronic waveforms of an electronic device, the probe comprising:

a substrate;

at least one layer including a base portion formed and supported on the substrate and a cantilever portion extending from the base portion and unsupported by the substrate;

a single electrically conductive probe tip formed on and extending downwardly from a free end of the cantilever portion in electrical communication with a semiconductor portion of the at least one layer;

an output electrode layer formed on the at least one layer and adapted to be electrically connected to a first electronic processor wherein the semiconductor portion of the at least one layer and a portion of the output electrode layer partially defining a photoresponsive switch, the cantilever portion having a bottom surface and a reflective top surface adapted to reflect a beam of coherent light wherein the reflected beam of the coherent light is processed by a second electronic processor to generate an image of the electronic device and wherein the at least one layer is adapted to receive and direct a pulsed switching beam to the photoresponsive switch to electrically communicate the probe tip with the output electrode layer to thereby sample an electronic waveform at a desired location on the electronic device when the probe tip is pressed into low force contact with the electronic device at the desired location.

2. The probe as claimed in claim 1 wherein the output electrode layer is formed on the bottom surface of the cantilever portion.

3. The probe as claimed in claim 1 wherein the substrate is a waveguide.

4. The probe as claimed in claim 3 wherein the substrate comprises an optical fiber wherein the switching beam is transmitted through the optical fiber to the photoresponsive switch.

5. The probe as claimed in claim 4 further comprising a fiber support fixedly secured to the optical fiber for supporting the optical fiber.

6. The probe as claimed in claim 5 further comprising a conductive layer formed on the fiber support for electrically communicating the output electrode layer with the first electronic processor.

7. The probe as claimed in claim 1 wherein the at least one layer includes first and second layers.

8. The probe as claimed in claim 7 wherein the first layer is a film of AlGaAs and the second layer is a film of LT-GaAs formed on the first layer.

9. The probe as claimed in claim 1 wherein the probe tip has a conical shape and a sub-micron tip radius.

10. The probe as claimed in claim 1 wherein the photoresponsive switch is a non-planar photoresponsive switch.

11. The probe as claimed in claim 1 wherein the photoresponsive switch is a planar photoresponsive switch.

12. The probe as claimed in claim 1 wherein the output electrode layer is formed on the at least one layer by photolithography.

13. The probe as claimed in claim 1 wherein the probe tip is formed on the at least one layer by self-terminating lift-off.

14. The probe as claimed in claim 1 wherein the at least one layer includes a film of LT-GaAs and the probe tip is formed on the film of LT-GaAs.

15. The probe as claimed in claim 14 wherein the at least one layer further includes an electrically conductive film of doped AlGaAs.

16. The probe as claimed in claim 1 wherein the output electrode layer is formed on the cantilever portion.

17. The probe as claimed in claim 1 further comprising an input electrode layer formed on the free end of the cantilever portion by photolithography and having a bottom surface wherein the probe tip is formed on and extends downwardly from the bottom surface of the input electrode layer and wherein the input and output electrode layers and the semiconductor portion define the photoresponsive switch.

* * * * *

UNITED STATES PATENT AND TRADEMARK OFFICE
CERTIFICATE OF CORRECTION

PATENT NO. : 5,442,300
DATED : August 15, 1995
INVENTOR(S) : John A. Nees and Shin-ichi Wakana It is certified that error appears in the above-indentified patent and that said Letters Patent is hereby corrected as shown below:

Column 1, prior to the "Other Publications" portion, please insert the following wording:

This invention was made in part with government support under Grant Number DAAL03-92-G-0294, awarded by the U.S. Army Research Office. The United States Government has certain rights in this invention.

Signed and Sealed this

Seventeenth Day of December, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,442,300
DATED : August 15, 1995
INVENTOR(S) : John A. Nees and Shin-ichi Wakana It is certified that error appears in the above-indentified patent and that said Letters Patent is hereby corrected as shown below:

Column 1,
please insert the following wording:

> This invention was made in part with government support under Grant Number DAAL03-92-G-0294, awarded by the U.S. Army Research Office. The United States Government has certain rights in this invention.

Signed and Sealed this

Thirty-first Day of December, 1996

Attest:

BRUCE LEHMAN

*Attesting Officer*     *Commissioner of Patents and Trademarks*